C. Marsh,

Snap Hook,

Nº 49,350. Patented Aug. 8, 1865.

Witnesses:
Emil Lofsnack
D. H. Stetson

Inventor:
Clark Marsh
for Thomas D. Stetson
Attorney

UNITED STATES PATENT OFFICE.

CLARK MARSH, OF BRIDGEPORT, CONNECTICUT, ASSIGNOR TO HOTCHKISS SONS, OF NEW YORK, N. Y.

IMPROVED SNAP-HOOK.

Specification forming part of Letters Patent No. 49,350, dated August 8, 1865.

*To all whom it may concern:*

Be it known that I, CLARK MARSH, of Bridgeport, in the county of Fairfield and State of Connecticut, have invented a certain new and Improved Snap or Spring Hook for Harnesses and the like uses; and I do hereby declare that the following is a full and exact description thereof.

The accompanying drawings form part of this specification.

Figure 1:
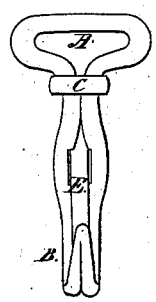
Figure 2:
Figure 3:
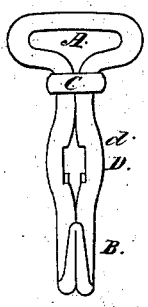
Figure 4:
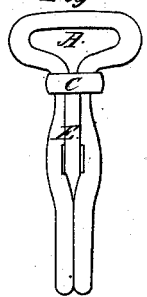
Figure 5:
Figure 6:
Figure 7:
Figure 8:
Figure 9:
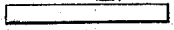
Figure 10:
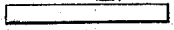

Figure 1 is a front view, Fig. 2 a side view, and Fig. 4 a rear view, of the hook complete in its ordinary condition. Fig. 6 is a side view of the hook with the spring forced back in the act of receiving a ring, a link of chain, or the like, to be secured. Fig. 3 is a front view of the main portion of the device, but with the spring or tongue omitted; and Fig. 5 is a central longitudinal section through the entire device. Figs. 7 and 8 show the clip which confines the spring to the other part, and Figs. 9 and 10 show the spring detached from the other parts. The red outlines in Fig. 5 show the position of the spring-tongue when it is violently strained in a certain direction, as by the shaking of the hook, or of the chain or other part which it is employed to confine.

Similar letters of reference indicate like parts in all the figures.

My invention relates to the provision for housing and guiding and protecting the spring or tongue.

To enable others skilled in the art to make and use my invention, I will proceed to describe its construction and operation by the aid of the drawings and of the letters of reference marked thereon.

The main body is formed of iron wire bent and welded in the ordinary manner.

The loop A is adapted, as usual, to receive the strap or part to which the hook is permanently secured, and the hook B is made of sufficient size and strength to embrace and hold the objects to which it is adapted to be attached at pleasure.

The clip C may be applied in any of the approved ways. I prefer a malleable cast-iron clip or strap in one solid piece, as indicated in Figs. 7 and 8.

The wires forming the main body are separated at the point D, and a clear space is cut by a suitable tool through this part, of a width a little greater than the width of the spring or tongue. This channel is very clearly indicated in Figs. 3 and 5.

The spring-tongue is indicated by E. It may be cut from a sheet of steel, or from a steel wire, and bent in the form indicated by a suitable press. After being properly tempered it is introduced through the hole at D, and is firmly secured to the main body by pressing the clip C upon it by a suitable die, or by a blow of a hammer, or by any approved plan. The finished hole at D is of sufficient length to allow a free traverse of the spring-tongue to the farthest extent required, as shown in Figs. 5 and 6. Thus housed and protected, the spring-tongue yields to receive the ring G, (see Fig. 6,) and returns to its proper position so soon as liberated, with the same effect as the ordinary spring-tongue, which is secured on the front side of the hook; but there may be a greater thickness to the spring-tongue E, with the same liberty to yield by reason of the increased length of the elastic part due to this construction. But the chief advantage which I claim for this invention lies in the guidance and protection which the spring-tongue E receives in its passage through the main part of the hook at the point D, and in the very efficient defense which this arrangement affords against an undue straining of the spring-tongue by the irregular and backward pulling or shaking of the part G after it is properly inclosed within the device.

Spring-tongues have been heretofore found illy adapted for hooks designed for some varieties of uses, because the ring, chain, staple, bar, or whatever shall be inclosed, as indicated by G, is liable to cause a severe strain on the spring-tongue, tending to break it off close to the confining-clip—a point where it requires to be most elastic, and is therefore necessarily thin and weak. My device braces the tongue against such strain at the intermediate point, d, adjacent to the hole D, as very plainly shown in Fig. 5, and my invention altogether allows the spring-tongue E to be made of such thickness and strength as to be amply able to resist all the strains to which the snap-hook is liable in all ordinary uses. My snap is thus able to serve without the additional hinged tongue, which has recently been deemed essential in snap-hooks, and the spring, although strong enough to endure alone, may be readily pressed backward by the unaided action of the hand in the ordinary manner.

Having now fully described my invention, what I claim as new, and desire to secure by Letters Patent, is as follows:

1. In snap-hooks, the employment of the spring E, in combination with a bearing, $d$, at some distance from the clip or root of the spring, adapted to brace the spring stiffly against the strain thereon in one direction, while allowing the elasticity of the entire spring to be made available in the proper yielding action, substantially as herein set forth.

2. In snap-hooks, the passing the spring E through the body, so that a portion shall serve in the front and another portion serve at the back and contribute its elasticity to operate the portion in the front, substantially as and for the purposes herein set forth.

CLARK MARSH.

Witnesses:
H. T. BLAKE,
AMUS S. TREAT.